US012320149B2

(12) United States Patent
Ma et al.

(10) Patent No.: US 12,320,149 B2
(45) Date of Patent: Jun. 3, 2025

(54) LOCKSET WITH SLIDING SPINDLE

(71) Applicant: Townsteel, Inc., City of Industry, CA (US)

(72) Inventors: Sybor Ma, La Puente, CA (US); Chad P. Moon, Colorado Springs, CO (US)

(73) Assignee: Townsteel Inc., City of Industry, CA (US)

( * ) Notice: Subject to any disclaimer, the term of this patent is extended or adjusted under 35 U.S.C. 154(b) by 224 days.

(21) Appl. No.: 17/093,534

(22) Filed: Nov. 9, 2020

(65) Prior Publication Data

US 2022/0145666 A1 May 12, 2022

(51) Int. Cl.

| | |
|---|---|
| ***E05B 17/04*** | (2006.01) |
| ***E05B 9/10*** | (2006.01) |
| ***E05B 13/00*** | (2006.01) |
| ***E05B 13/10*** | (2006.01) |
| ***E05B 15/00*** | (2006.01) |
| ***E05B 55/00*** | (2006.01) |
| ***E05B 55/06*** | (2006.01) |
| ***E05B 63/16*** | (2006.01) |

(52) U.S. Cl.

CPC ............ *E05B 17/044* (2013.01); *E05B 9/105* (2013.01); *E05B 13/004* (2013.01); *E05B 13/101* (2013.01); *E05B 15/0033* (2013.01); *E05B 55/005* (2013.01); *E05B 55/06* (2013.01); *E05B 63/16* (2013.01); *E05Y 2900/132* (2013.01)

(58) Field of Classification Search

CPC .......... E05B 9/10; E05B 9/105; E05B 13/004; E05B 13/005; E05B 13/101; E05B 15/0033; E05B 17/04; E05B 17/044; E05B 17/045; E05B 17/046; E05B 55/005; E05B 55/06; E05B 63/16

See application file for complete search history.

(56) References Cited

U.S. PATENT DOCUMENTS

| | | |
|---|---|---|
| 3,123,995 A | 3/1964 | Russell et al. |
| 3,390,558 A | 7/1968 | Tornoe et al. |
| 3,791,180 A | 2/1974 | Doyle |

(Continued)

OTHER PUBLICATIONS

U.S. Appl. No. 17/147,325, filed Jan. 12, 2021, Moon et al.
"EP-55 Preview." Victor Keyless Lock Inc. N.p., n.d. Web. Jan. 9, 2017. http://www.victorelock.com/Manuals. pp. 1-29.

*Primary Examiner* — Christopher J Boswell
(74) *Attorney, Agent, or Firm* — Eric W. Cernyar; Huffman Law Group, PC

(57) ABSTRACT

A lockset with a sliding spindle assembly allows ingress using a key on the outside or a button on the inside. The sliding spindle assembly provides first and second sliding mechanisms operated from the outside and inside, respectively, that operate a clutch to couple the outside handle to the main spindle. Each sliding mechanism comprises a key cylinder or twist and/or push button lock that rotates a cam to linearly advance (slide) a cam follower that incorporates a spindle receiver. The first sliding mechanism slides its spindle receiver between clutching and non-clutching positions with respect to the main spindle. The second sliding mechanism slides the main spindle itself between clutching and non-clutching positions with respect to the first sliding mechanism's spindle receiver. The sliding spindle assembly can be incorporated into a legacy lockset and also be used in a double-latch lockset.

24 Claims, 7 Drawing Sheets

(56) References Cited

U.S. PATENT DOCUMENTS

| | | | | |
|---|---|---|---|---|
| 3,875,772 | A | 4/1975 | Ebersman et al. | |
| 3,881,331 | A | 5/1975 | Tranberg et al. | |
| 3,910,613 | A | 10/1975 | Nolin | |
| 3,990,277 | A | 11/1976 | Mullich | |
| 4,418,552 | A | 12/1983 | Nolin | |
| 4,516,798 | A | 5/1985 | Bergen | |
| 4,606,203 | A | 8/1986 | Esser | |
| 5,074,607 | A * | 12/1991 | Lin | E05B 55/005 292/359 |
| 5,077,992 | A | 1/1992 | Su | |
| 5,257,837 | A | 11/1993 | Bishop | |
| 5,257,838 | A | 11/1993 | Lin | |
| 5,325,687 | A | 7/1994 | Lin | |
| 5,342,101 | A | 8/1994 | Shih | |
| 5,490,695 | A | 2/1996 | Shiue | |
| 5,495,731 | A | 3/1996 | Riznik | |
| 5,496,082 | A | 3/1996 | Zuckerman | |
| 5,513,505 | A | 5/1996 | Dancs | |
| 5,551,736 | A | 9/1996 | Fann et al. | |
| 5,611,581 | A | 3/1997 | Ghostley | |
| 5,620,211 | A | 4/1997 | Ellis | |
| 5,657,653 | A | 8/1997 | Hensley et al. | |
| 5,707,090 | A | 1/1998 | Sedley | |
| 5,713,612 | A | 2/1998 | Kajuch | |
| 5,809,812 | A | 9/1998 | Gallego | |
| 6,023,952 | A | 2/2000 | Mantarakis et al. | |
| 6,128,933 | A | 10/2000 | Mirshafiee et al. | |
| 6,216,500 | B1 * | 4/2001 | Kang | E05B 55/005 292/357 |
| 6,419,288 | B1 | 7/2002 | Wheatland | |
| 6,443,506 | B1 | 9/2002 | Su | |
| 6,454,322 | B1 | 9/2002 | Su | |
| 6,564,596 | B2 | 5/2003 | Huang | |
| 6,581,426 | B2 | 6/2003 | Bates et al. | |
| 6,584,818 | B2 | 7/2003 | Bates et al. | |
| 6,612,141 | B2 | 9/2003 | Bates et al. | |
| 6,615,629 | B2 | 9/2003 | Bates et al. | |
| 6,622,535 | B2 | 9/2003 | Chiang et al. | |
| 6,725,693 | B2 | 4/2004 | Yu et al. | |
| 6,758,070 | B2 | 7/2004 | Yu et al. | |
| 6,807,833 | B1 * | 10/2004 | Huang | E05B 55/005 70/217 |
| 7,100,407 | B2 * | 9/2006 | Chen | E05B 55/005 70/472 |
| 7,257,973 | B2 | 8/2007 | Romero et al. | |
| 7,363,784 | B2 | 4/2008 | Shvarts | |
| 7,559,219 | B2 * | 7/2009 | Chen | E05B 55/005 292/336.3 |
| 7,856,856 | B2 | 12/2010 | Shvarts | |
| 8,182,006 | B2 * | 5/2012 | Liu | E05B 55/005 292/357 |
| 8,201,858 | B1 | 6/2012 | Moon et al. | |
| 8,292,336 | B2 | 10/2012 | Moon | |
| 8,419,084 | B2 | 4/2013 | Ding et al. | |
| 8,419,086 | B2 | 4/2013 | Moon | |
| 8,424,935 | B2 | 4/2013 | Moon | |
| 8,491,023 | B2 * | 7/2013 | Brannaman | E05B 13/002 292/336.5 |
| 8,844,330 | B2 | 9/2014 | Moon et al. | |
| 9,033,375 | B1 | 5/2015 | Moon et al. | |
| 9,394,722 | B2 | 7/2016 | Moon et al. | |
| 9,528,300 | B2 | 12/2016 | Moon et al. | |
| 9,611,672 | B2 * | 4/2017 | Murphy | E05B 55/005 |
| 2001/0025517 | A1 | 10/2001 | Bates et al. | |
| 2001/0028172 | A1 | 10/2001 | Bates et al. | |
| 2002/0017121 | A1 | 2/2002 | Bates et al. | |
| 2002/0092557 | A1 | 7/2002 | Ghoshal | |
| 2002/0096888 | A1 | 7/2002 | Bates et al. | |
| 2002/0096891 | A1 | 7/2002 | Bates et al. | |
| 2002/0104339 | A1 | 8/2002 | Saner | |
| 2004/0107747 | A1 | 6/2004 | Chang | |
| 2010/0263418 | A1 | 10/2010 | Moon | |
| 2012/0013135 | A1 | 1/2012 | Moon | |
| 2012/0167646 | A1 | 7/2012 | Sharma et al. | |
| 2012/0198896 | A1 | 8/2012 | Moon | |
| 2013/0239631 | A1 | 9/2013 | Moon et al. | |
| 2013/0239632 | A1 | 9/2013 | Moon et al. | |
| 2014/0196509 | A1 | 7/2014 | Moon et al. | |
| 2016/0298358 | A1 | 10/2016 | Moon | |
| 2016/0298360 | A1 | 10/2016 | Moon | |
| 2016/0305160 | A1 | 10/2016 | Moon et al. | |
| 2017/0122007 | A1 | 5/2017 | Moon et al. | |
| 2018/0187454 | A1 | 7/2018 | Moon et al. | |
| 2018/0187464 | A1 | 7/2018 | Moon et al. | |
| 2020/0327758 | A1 | 10/2020 | Ma et al. | |
| 2021/0277684 | A1 | 9/2021 | Moon et al. | |

* cited by examiner

LOCKSET WITH SLIDING SPINDLE

TECHNICAL FIELD

The present disclosure generally relates to locksets, and in particular, to locksets that support multiple lock functions.

BACKGROUND

There is need in the art for a double latch lockset that improves convenience, efficiency, and safety.

Locksets often incorporate a spindle assembly that extends between the inside and outside handles. They typically incorporate either a locking mechanism that blocks further turning of the spindle assembly or a clutch mechanism that unclutches the outside handle from the spindle assembly. These mechanisms generally involve movement of a locking tab or coupling and decoupling a driver operated by the outside handle and a lever connected to the spindle.

It is not believed that there is any commercially available lockset whose spindle assembly clutches a main spindle to an outside handle by moving the main spindle along its longitudinal axis into a clutch sleeve mounted for rotation about the axis of the spindle assembly.

SUMMARY

This application discloses an embodiment of a sliding spindle assembly and several embodiments of a lockset having a sliding spindle assembly. The lockset operates at least a latchbolt, and optionally also a deadbolt, that selectably blocks or allows ingress into and/or egress from an access-controlled space. The sliding spindle assembly comprises a main spindle for retracting and projecting a latchbolt, first and second locking actuators (incorporated, e.g., in outside and inside door handles, respectively) each comprising a push button and/or twist button or a key cylinder. When the spindle assembly is assembled, the first locking actuator is operatively connected to a first spindle coupler or receiver to selectively slide the first spindle coupler into or out of engagement with a first end of the main spindle. Also, the second locking actuator is operatively connected, via the second spindle coupler, to a second end of the main spindle to selectively slide the main spindle into or out of engagement with the first (not the second) spindle coupler or receiver. (Once assembled, the second spindle coupler stays coupled to the main spindle; only the first spindle coupler is engaged and disengaged with the main spindle.) As such, the sliding spindle assembly provides two sliding mechanisms to unlock the lockset (i.e., provide access from the outside): a first mechanism operated from outside that slides the first spindle coupler into a clutching position with respect to the main spindle; and a second mechanism operated from the inside that slides the main spindle into a clutching position with respect to the first spindle coupler.

In one implementation of the assembled spindle assembly, the spindle is operatively connected to a latchbolt such that rotation in one direction projects the latchbolt and rotation in an opposite direction retracts the latch. Also, an outside handle is operative to rotate the main spindle and operate the latchbolt when the first spindle coupler is engaged with the first end of the main spindle. Contrariwise, the outside handle is inoperative to rotate the main spindle and operate the latchbolt when the first spindle coupler is disengaged from the first end of the main spindle.

Also, in one implementation, a cam assembly that converts rotational movement of the first locking actuator into linear movement of the coupler, wherein the first cam assembly comprises a first cam and a first follower that incorporates the coupler. Moreover, a second cam and follower assembly that converts rotational movement of the second locking actuator into linear movement of the main spindle, wherein the second cam assembly comprises a second cam and a second follower. More particularly, the first locking actuator is coupled to the first cam for rotation, the second locking actuator is coupled to the second cam for rotation, rotation of a first cam results in linear movement of the first follower, and rotation of a second cam results in linear movement of the second follower.

In one implementation, the coupler is a first receiver that is incorporated into the first follower, and the first receiver is shaped to fit over the first end of the spindle. Furthermore, the second follower may incorporate a second receiver, so that when the spindle assembly is assembled, the second receiver is permanently engaged with the second end of the spindle.

In another implementation, the first follower pushes, but does not incorporate, the coupler. In yet another implementation, the second cam and follower assembly is omitted because a push button is used in the inside handle to push the coupler into clutching engagement with the main spindle.

In another embodiment, a lockset is provided comprising a spindle-operated latch-retracting assembly, a main spindle, a (first) spindle coupler, and handle spindles. (The second spindle coupler recited in the previous embodiment is not critical because once assembled, it is kept coupled to the main spindle; also, the main spindle, second spindle coupler, and a second follower could be integrated into a single piece). The main spindle is mounted for both rotational and linear axial movement that, when rotated sufficiently in at least one direction, operates the latch-retracting assembly to retract a latch. A first lock cylinder that would typically be located outside of an entryway is operative to move the spindle coupler along the main spindle axis to engage and disengage the main spindle. A second lock cylinder or a twist button that would be typically located inside of the entryway is operative to move the spindle coupler along is operative to move the main spindle along its axis to engage and disengage the spindle coupler.

A first handle spindle—which in a common installation would be for the outside handle—is selectively linked via the spindle coupler to the main spindle. When the spindle coupler is engaged to the main spindle, the handle spindle is operative to turn the spindle to retract the latch. But when the spindle coupler is disengaged from the main spindle, the handle spindle is free to rotate through its range of motion but is inoperative to turn the spindle to retract the latch.

In one implementation, the lockset further comprises a first cam and first cam follower (the cam follower may be merged with the spindle coupler described above) that links the first lock cylinder or button to the spindle coupler. In another implementation, the lockset further comprises a first cam follower interoperative with the first cam, which comprises a body and a partially circumferential ramp. The first cam follower has a cam-facing surface that complements (and when collapsed nests into a close top-surface contacting fit with) the first cam surface. The first cam follower is also slidingly mounted inside the first handle spindle so as to turn with the inside handle spindle. When pushed by rotation of the first cam, the first cam follower, which rides in slots of the first handle spindle, slides into clutching engagement with the main spindle. The first cam follower incorporates the spindle coupler, which is defined by a spindle-end-shaped receiver opposite the cam-facing surface of the first cam follower. The first cam, which interacts with the first cam follower, comprises a body and a partially circumferential ramp.

Accordingly, the first cam is operable to rotate in a first direction to linearly engage the spindle coupler to the main spindle, thereby coupling an outside handle to the main spindle and enabling latchbolt retraction from outside. Furthermore, the first cam is operable to rotate in a second direction, opposite the first direction, to return the spindle coupler into the outside-handle-uncoupling position.

In another implementation, the lockset further comprises a second cam and second cam follower interoperative with the second cam, both of which ride in a second handle spindle connected to a second handle. The second cam and second cam follower link the second lock cylinder or button to the main spindle. The second cam is operated by the second key cylinder or twist button, so that the second cam rotates with the key or twist button. The second cam follower has a cam-facing surface that, when pushed by rotation of the second cam (i.e., in a first direction), pushes the cam follower forward, driving the main spindle into clutching engagement with the spindle coupler (which in one implementation is the first cam follower). This, in turn, couples the outside handle to the main spindle and enables latchbolt retraction from outside.

The second cam is also operable to rotate in a second direction, opposite the first direction, to return the spindle coupler into the outside-handle-uncoupling position. When the button lock is in an outside-handle-decoupling position (i.e., the cam has been rotated back), a spring biases the second cam follower into a position that disengages the second cam follower from the main spindle.

When the second handle spindle is rotated (typically by a doorknob or lever), the cam follower pushes the main spindle linearly along its axis into clutching engagement with the spindle coupler. Thus, both the inside and outside locking/unlocking mechanisms act to engage the spindle coupler to the main spindle. However, the inside and outside locking/unlocking mechanisms differ at least in that the outside locking/unlocking mechanism slides the spindle coupler, while the inside locking/unlocking mechanism slides the main spindle.

The second cam follower is, when assembled, permanently linked (i.e., not detachable through normal operation of the lockset, although it can be disassembled when disassembling the lockset) to the main spindle. For safety reasons, it is important that persons inside a building can exit to flee a fire, building collapse, first person shooting situation, or other grave danger. A permanent linkage to the inside handle helps to guarantee the ability to flee.

The first and second cams are mounted inside the first and second handle cylinders for rotational movement inside and with respect to the cylinders. The first and second cam followers are also mounted inside the first and second handle cylinders for sliding axial movement with respect to the cylinders.

When the twist button or key is rotated, the second cam in conjunction with the second cam follower causes the main spindle to slide along its axis. Because the cams are mounted for rotation in the first and second handle cylinders, they have a shape that is referred to in the industry by the word "barrel," even for purely cylindrical parts that do not bulge out in the middle.

An enhanced version of the above lockset also includes a deadbolt and a secondary spindle driver assembly coupling the outside handle to the main spindle that enables upward movement of the outside handle to project the deadbolt without requiring a key and without allowing downward movement of the handle to retract the deadbolt. The secondary spindle driver assembly comprises a handle coupler coupled to the outside handle and a spindle driver coupled to the main spindle. The handle coupler is operative to transfer rotational motion in a first rotational direction to the spindle driver, and to thereby project the deadbolt into a locking position. The handle coupler is inoperative to transfer rotational movement in a second rotational direction opposite the first rotational direction, and thus is inoperative to retract the deadbolt back to an unlocking position. When the deadbolt is projected, retraction of the deadbolt from outside requires a key, which is operatively asymmetric from not requiring a key to project the deadbolt from outside. The first handle spindle is only operative in the second rotational direction to retract the latch. Rotation of the outside handle in the second direction is operative, when the deadbolt is retracted and the spindle coupler is clutchingly engaged with the main spindle, to retract the latchbolt, and rotation of the outside handle in the first direction is operative, when the deadbolt is retracted, to project the latchbolt.

In yet another embodiment, a double-latch lockset is provided. The double-latch lockset comprises a latchbolt, a deadbolt, an inside handle, an outside handle, a lock cylinder or button in the inside handle, a lock cylinder in the outside handle, a spindle operable through turning to retract and project the latchbolt, a clutch (i.e., the first spindle coupler recited above) between the spindle and the outside handle, and a cam operated by the lock cylinder or button to engage and disengage the clutch in order to convert the lockset between a restricted access function and a passageway function.

In one implementation, a link assembly between the spindle and the deadbolt projects the latchbolt when the inside handle is rotated or moved in one direction from a neutral main position to a first limit. The link assembly also retracts the latchbolt when the inside handle is rotated or moved in an opposite direction from the neutral main position to a second limit.

In another implementation, the double-latch lockset comprises a key receptacle in the outside handle. The key receptacle is operable to engage and disengage the clutch in order to convert the lockset between a restricted access function and a passageway function.

In yet another implementation, the double latch lockset further comprises a cam between the twist knob and the clutch, the cam being operative to move the spindle along its axis between clutch-engaging and clutch-disengaging positions.

Each of the foregoing embodiments can be extended to provide another lock function—the ability to lock the deadbolt from outside by lifting the outside handle, even when the clutch is disengaged. A secondary spindle driver assembly is provided to couple the outside handle to the main spindle. The secondary spindle driver assembly comprises a handle coupler coupled to the outside handle and a spindle driver coupled to the main spindle. The handle coupler is operative to transfer rotational motion in a first rotational direction to the spindle driver, thereby projecting the deadbolt into a locking position. But the handle coupler is inoperative to transfer rotational movement in a second rotational direction opposite the first rotational direction, and thus is inoperative to retract the deadbolt back to an unlocking position. At the same time, with the primary spindle driver assembly, the first handle spindle is only operative in the second rotational direction to retract the latch. Consequently, rotation of the outside handle in the second direction is operative, when the deadbolt is retracted and the spindle coupler is clutchingly engaged with the main spindle, to retract the latchbolt, and rotation of the outside handle in the first direction is operative, when the deadbolt is retracted, to project the latchbolt. Accordingly, when the deadbolt is projected, retraction of the deadbolt from outside requires a key, which is operatively asymmetric from not requiring a key to project the deadbolt from outside.

Various electronic actuators, switches, controllers, and other devices may be employed with the latchsets and its components. The resultant latchsets may be fully or largely mechanical, electronic, or a combination thereof.

Kits are envisioned comprised of various combinations, including, but not limited to a first retractable latch, a second retractable latch, a deadbolt, inside and/or outside actuators for the latches, drive assemblies, clutch assemblies, a locking rack and pinion, sliding actuator assemblies, latch cams, latchbolt assemblies, and a latchbolt tail.

Other systems, devices, methods, features, and advantages of the disclosed product, kits, and methods for forming a double latch lockset and parts of locksets will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings

DETAILED DESCRIPTION

Figure 1:
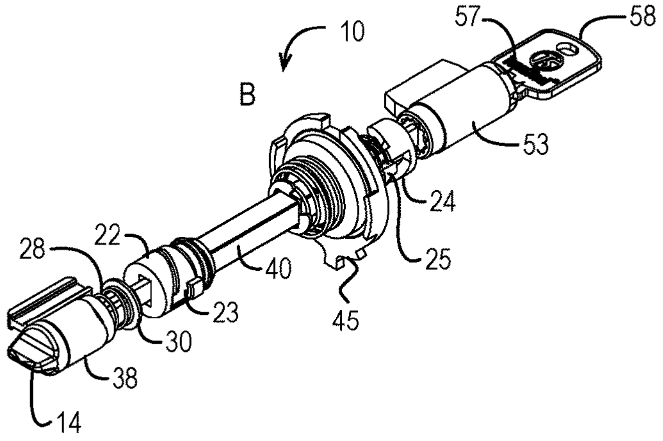
FIG. 1 is a perspective view of a sliding spindle lockset mechanism.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the technology described herein, as illustrated in FIGS. 1-13, specific terminology is employed for the sake of clarity. The technology described herein, however, is not intended to be limited to the specific terminology so selected, and it is to be understood that each specific element includes all technical equivalents that operate in a similar manner to accomplish similar functions.

Some references make a distinction between "locking" and "clutching" mechanisms, with the former referring to a mechanism that blocks an outside handle from rotating and the latter referring to a mechanism that allows the outside handle to turn freely, but without engaging the lockset to retract the latch. In this specification, "locking" is used for convenience to refer to both of these mechanisms, because the result is the same and, ultimately, the bolt or bolts perform a blocking function for either of the two above-mentioned mechanisms. Should a distinction be warranted in some context, then that context will qualify "locking" with additional words to specify a blocking-type lock.

To distinguish between the inside and outside of the access-restricted space, usual terms such as "inside" (or "inner" or "interior") and "outside" (or "outer" or "exterior") or "ingress" and "egress" are used in a loose sense in the specification and claims. The use of the foregoing terms in this specification is not limited to installations in doors in which one side is "inside" a structure and one side is "outside" that structure. Rather, in this specification, "inside" and "outside" are relative functional terms assigned two sides of the lockset. More specifically, the "inside" of the lockset is a side that imposes the fewest requirements to enable passage through a door to which the lockset is installed—for example, no key, code or credential required. By contrast, the "outside" of the lockset means either a side that, at least in a locked configuration, restricts passage without use of a key, code, credential, or secret knowledge to pass through.

There are contexts in which the least restrictive access to traverse a boundary is provided on what would colloquially be considered the "outside." Examples include psychiatric hospital safe rooms and prisons. In these corner cases, references to "inside" and "outside"— unless expressly qualified otherwise—should be referred to oppositely of their colloquial meanings. As used in this specification, "inside" and "outside" are to be functionally—not structurally—understood.

In contexts where "inside" and "outside" would be undefined—because, for example, equal control is given on both sides of the lockset, or which side is more restrictive is undefined—"inside" and "outside" can refer to either actual side of the fence or other partition whose access is controlled.

In the specification, mention is made of the "rotational equivalent"—using a knob for example—of pulling up a lever-type handle on a door. The "rotational equivalent" depends on context, for example, is a right hand or left hand door, which side of the door for which you are turning the knob, and whether the lever extends from the bore hole toward the center of the door (this is conventional) or from the bore hole (aka lockset bore) toward the nearest edge of the door. If one were to pull up a conventionally installed lever handle on the inside of a left-hand door, for example, this would be equivalent to counterclockwise rotation of a knob that replaced the lever handle. Contrariwise, if the lever were installed in the conventional direction on the outside of the door, the equivalent rotational direction would be clockwise. In an embodiment described herein, the "rotational equivalent" also depends on the direction in which the ramps of certain cams descend.

Figure 2:
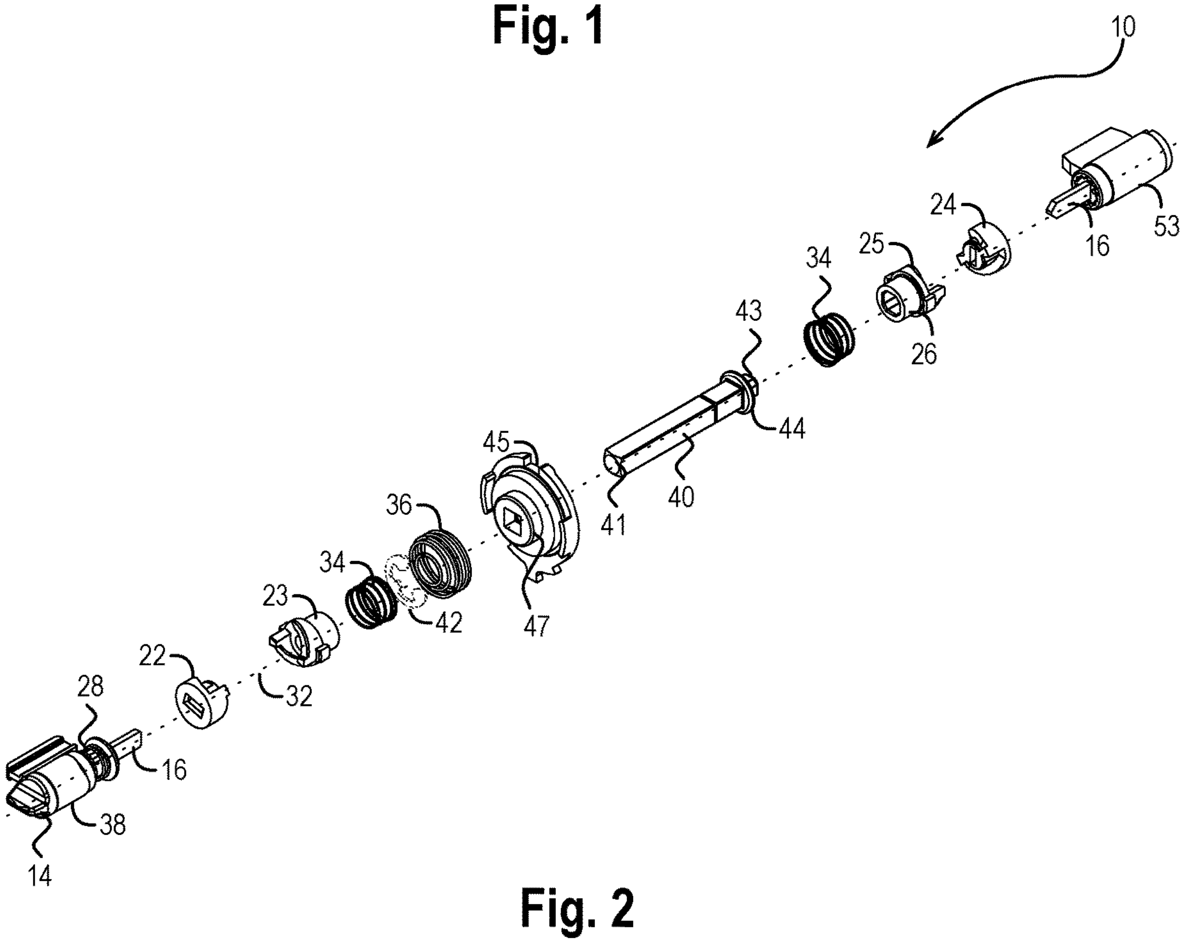
FIG. 2 is an exploded perspective view of the sliding spindle lockset mechanism.
Figure 3:
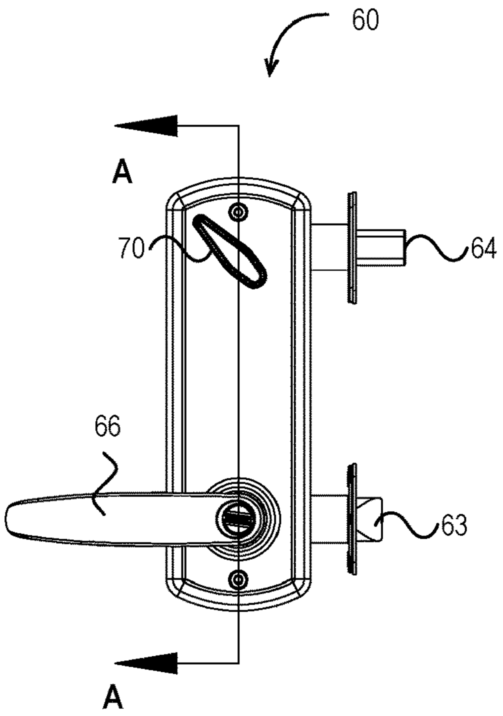
FIG. 3 is a front view of a double latch lockset incorporating the sliding spindle lockset mechanism.

FIGS. 1-3 illustrate assembled and exploded views of one embodiment of a lock stem and main spindle assembly 10. The spindle assembly 10 comprises two key cylinders 53 for keyed operation or, in what is expected to be more typical, a key cylinder 53 for the outside and a manually operated lock button cylinder 38 for the inside. The lock button cylinder 38 is, in one implementation, operated with an ingress-controlling lock button 14. The lock button 14—which is mounted to the button cylinder 38—may be a push button, a twist button, or a combination of the two that locks or unlocks the latch to ingress. In the implementation of FIG. 2, a twist lock button 14—which is biased into a selected detent position by coil spring 28 which is seated against a washer 30—is utilized. It will be understood that the lock button cylinder 38 could be replaced with any other suitable locking mechanism compatible with a sliding spindle mechanism as claimed herein.

The inside handle 66 (FIG. 8) is mounted on the inside handle cylinder 20. The outside handle 68 is mounted on the outside handle cylinder 20. Each of the key cylinder(s) 53 and/or lock button cylinder 38 carry a key cylinder stem 16 or a lock button cylinder stem 16. The stems 16 turn with the button 14 or key 58 to which it is connected. This enables rotational motion from the button 14 or the key 58 to be transmitted to a sliding spindle mechanism of the lock stem and main spindle assembly 10.

The sliding spindle mechanism comprises two collapsible and expandable barrel assemblies and the main spindle 40. Each barrel assembly comprises a barrel cam 22 or 24 (which in one implementation are identical) cooperating with a barrel cam follower 23 and 25 (which in one implementation are mostly identical). Slots 52 (FIG. 5A) in the button-side barrel cam 22 and a key-side barrel cam 24 receive stems 16 and/or 14 of the key and/or button cylinders 53 and/or 38. Also, each barrel cam follower 23, 25 has an axially-oriented hole—a blind square hole 117 for the barrel cam follower 23 and a non-equilateral octagonal through hole 105 for the barrel cam follower 25—that fits snuggly but non-interferingly over the ends 41 and 43, respectively, of main spindle 40.

Accordingly, actuation of a thumbturn button 14 or key 58 causes rotation of the barrel cam 22 or 24 of the sliding spindle mechanism. This, in turn, drives the barrel cam follower 23 or 25, respectively, to either slide the main spindle 40 axially in and out of engagement with the key-cylinder side barrel cam follower 25, or axially slide the barrel cam follower 25 into engagement with the main spindle 40.

Figure 5A:
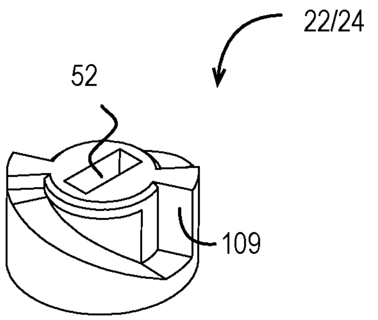
FIG. 5A is a perspective view of a barrel cam, two of which are used in the sliding spindle lockset mechanism.
Figure 5B:
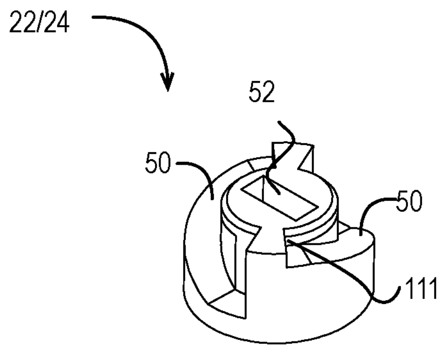
FIG. 5B is another perspective view of the barrel cam.
Figure 6A:
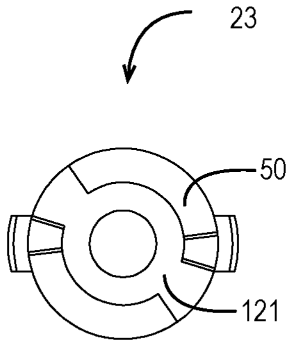
FIG. 6A is a top end view of a barrel cam follower incorporated into the button cylinder side of the sliding spindle lockset mechanism.
Figure 6B:
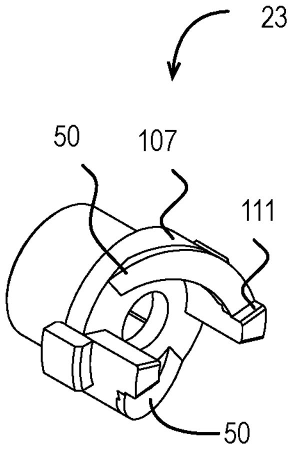
FIG. 6B is a perspective view of the barrel cam follower of FIG. 6A
Figure 6C:
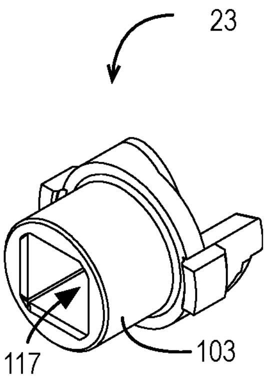
FIG. 6C is another perspective view of the barrel cam follower of FIG. 6A
Figure 7A:
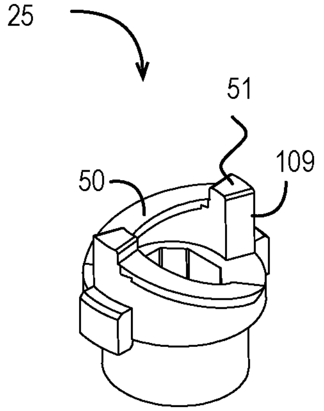
FIG. 7A is a perspective view of a barrel cam follower incorporated into the key cylinder side of the sliding spindle lockset mechanism.
Figure 7B:
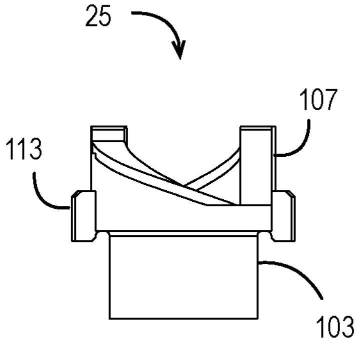
FIG. 7B is a side view of the barrel cam follower of FIG. 7A.
Figure 7C:
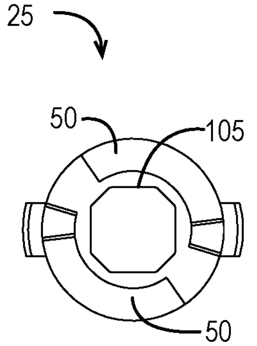
FIG. 7C is a top view of the barrel cam follower of FIG. 7A

FIGS. 5-7 illustrate embodiments of barrel cams 22 and 24 and their corresponding barrel cam followers 23 and 25. In FIG. 5, identical barrel cams 22 and 24 are positioned on opposite thumbturn and key-cylinder sides of the spindle assembly 10. FIG. 6 shows a button-side spindle driving barrel cam follower 23 against which barrel cam 22 acts. FIG. 7 illustrates a key-cylinder-side spindle driving barrel cam follower 25 against which barrel cam 24 acts.

The "cam" of each barrel cam 22 and 24 consists primarily of two symmetrically opposed ramps 50 that spiral about 120° around opposite perimeter sections of the barrel cam. The top of each ramp 50 begins at a stop 111 and ends just before a shoulder 109. In the implementation shown, the ramps of the barrel cams and barrel followers 22-25 descend in a counterclockwise direction, when facing the ramps 50.

Accordingly, in this implementation, as a barrel cam 22, 24 twists in that direction, which is also the clockwise direction when facing the bottom of the barrel cam 22, 24, the barrel cam 22, 24 urges the corresponding barrel cam follower 23, 25 to move to a distal, less juxtaposed position, away from the barrel cam 22, 24, and closer to the center of the door borehole. The present disclosure is, of course, easily adapted to mechanisms that reverse the rotational directions discussed above.

Figure 8:
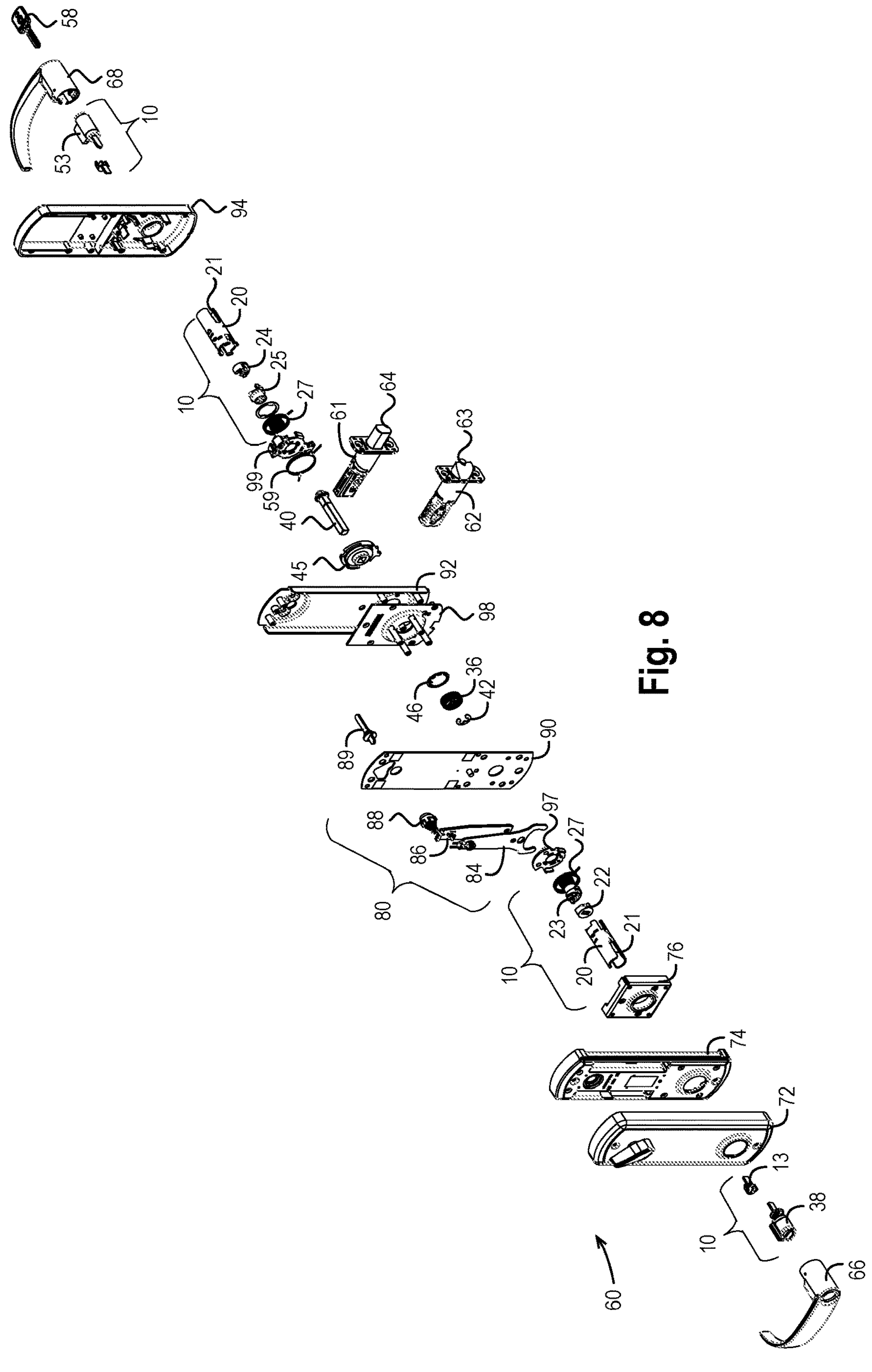
FIG. 8 is an exploded perspective view of a double latch lockset incorporating the sliding spindle lockset mechanism of FIG. 1.

In the barrel cam followers 23 and 25, the ramps 50 are located along the upper portion 107 of the barrel cam followers 23 and 25. Each of the barrel cam followers 23 also have spiraling ramps 50 similar to and shaped to cooperate with those of the barrel cams 22 and 24. Shoulders 109 block the barrel cams 22-25 from rotating with respect to each other past a fully juxtaposed limit. The top of the shoulder 109 acts as a stop 51 that prevents the barrel cams 22-25 from rotating with respect to each other past a most distal, nearly separated limit. Side tabs 113 seat the barrel cam followers 23 25 into the slots 21 of the handle spindles 20 (FIG. 8). The illustrated handle spindles are formed of rolled-up stamped sheet metal, but in another embodiment the handle spindles are formed by machining.

Each of the barrel cams 22, 24 and barrel cam followers 23, 25 have a cylindrical body and a circular base, upper 107 and lower 103 sections, and shoulders 109 and tabs 107. The cylindrical or barrel shape conforms with the tubular handle spindles 20 in which they are seated. The base portion 103 is smaller in diameter than the upper portion 107, and the interface between these two portions 103 and 107 provide a spring seat for a spring 34.

The square holes incorporated in the barrel cam followers 23 and 25 interface the followers to the main spindle 40. The blind square hole 117 of follower 23 selectively receives and clutches a thumbside end 41 of the square spindle 40, until it butts up against a blind hole bottom 106 that acts as a stop to the spindle 40. The key-side through hole 105 of follower 25 selectively receives and clutches a key-side end 43 of the spindle 40. The non-square shape (e.g., octagonal) of the through hole 105 frustrates over-torqueing attacks by making it more difficult to use a screwdriver or other tool to operate the lockset 60 if the cylindrical lock is removed in an attack.

Each of the barrel cam followers 23 and 25 are biased away from an outside-handle-enabling positions (i.e., positions engaging the barrel cam follower 25 to the main spindle 40) by a spring 34 and into close juxtaposition with its respective barrel cam 22 or 24. The springs 34 are staked against stop plates 29 in the inside and outside lock trims. The main spindle 40 is operable to move along axis 32 between a clutching position that engages the outside handle 68 and one that frees the spindle 40 from the "clutch" or grasp of the outside barrel cam follower 25 along with the handle 68 to which it is connected. Depending on whether the spindle 40 is clutched, rotation of the outside handle 68 rotates the spindle 40 about its axis 32, which in turn drives the latch link assembly 62 (FIG. 8) to project or retract the latchbolt 63. In summary, each barrel cam and follower pair (22 & 23, 24 & 25) comprises a selectively collapsible and expandable assembly that lengthens and shortens to axially reposition the main spindle 40 in response to button 14 actions or key 58 turns.

A spring 36 is mounted about the spindle 40 between a secondary spindle driver 45 and a retaining clip or clip plate 42 mounted on the spindle 40. The spring 36 urges the square spindle 40 toward the "inside" facing part of the door and lock hardware.

Turning the stem 16 and/or 14 cams the latch-operating square main spindle 40—which operates a latch-retracting assembly 62—between clutch-engaging and clutch-disengaging positions along the axis 32 of the main spindle 40. More particularly, turning the twist lock button 14 from a first position to a second position engages the outside handle 68 to the spindle 40, unlocking the lock mechanism and allowing ingress from the outside to the inside. Turning the button 14 back from the second position to the first position disengages the outside handle 68 from the spindle 40, locking the lock mechanism and hindering ingress from the outside to the inside.

In another embodiment, not shown, the button cylinder 38 with its combination button 14, and the barrel cam and follower 22 & 23 are replaced with a push button connected to a clutch sleeve. No rotation of the push button is involved. Because it is a push button, the clutch sleeve is caused to advance linearly without any camming action. Alternatively, two-barrel cam and follower pairs (or a 3-part equivalent)—with one of the followers constituting a clutch sleeve—are used, back-to-back, on the button side of the lockset 60 to amplify or reduce the ratio of button axial movement to clutch sleeve axial movement. To amplify or reduce the ratio, the ramp slopes for the two back-to-back barrel cams are different.

It should be observed that barrel cam follower 25 may alternatively be characterized as a clutch sleeve. In the depicted embodiment, the barrel cam follower 23 does not function as a clutch sleeve because it is spring-biased to always engage the button-side end 41 of the spindle 40. In other embodiments, the barrel cam follower 23, or both barrel cam followers 23 and 25 could disengage from the spindle 40, thereby functioning as a clutch sleeve or sleeves. But this would change the function of the inside handle 66, configuring it to turn freely without engaging the spindle 40 when the button 14 is projected. Generally, this is not desired, although there may be some useful applications (e.g., emergency lockdown), perhaps including additional modifications (e.g., electronic triggering abilities to put the doorknob in a projected position).

Advantageously, the sliding spindle mechanism described above makes it possible to enable two mechanisms—the button 14 and the key 58—to engage or disengage the same keyside-proximate barrel cam follower 25 to the keyside end 43 of the spindle 40. This way, the spindle 40 is engaged whenever the key 58 or the button 14 is actuated. Only when both the key 58 and button 14 are in locked positions does the spindle 40 stay disengaged from the outside handle 68. When the inside button 14 is disengaged, the outside handle is normally unable to retract the latch. Instead, it can be moved freely but nonoperatively through its range of motion. However, operating a key 58 in the keyed actuator of the outside door handle causes barrel cam 24 with a partially spiraling ramp portion to urge barrel cam follower 25 into a clutching configuration with respect to the second end 43 of the square spindle, thereby configuring the outside handle 68 to be operated to retract the latchbolt 63.

Figure 14:
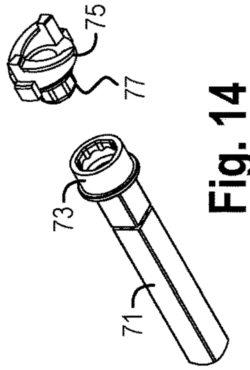
FIG. 14 illustrates an alternative main spindle and key-cylinder side barrel cam follower in which the male insert and female receiver are swapped.

FIG. 14 illustrates an alternative main spindle 71 and key-cylinder side barrel cam follower 75 in which the male insert 77 and female receiver 73 are swapped so that they belong to the barrel cam follower 75 and main spindle 71, respectively. This may have an advantage over the earlier disclosed embodiment with respect to resisting an attack using a screwdriver or other implement. Otherwise, the functions are identical. In yet another embodiment, not shown, a similar swap is done on the thumbturn side, so that the thumbturn-side end of the main spindle 40 or 71 incorporates a receiver, and the receiver 103 of the thumbturn-side barrel cam follower 23 is replaced with a male insert 77.

Figure 9C:
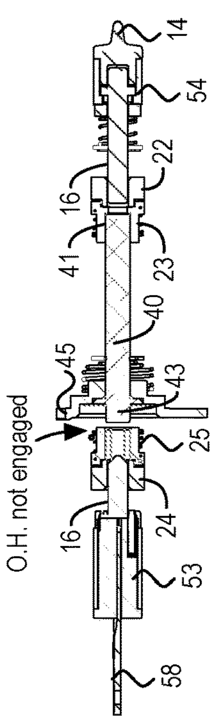
FIG. 9C is a cross sectional view of the sliding lockset mechanism along line B-B of FIG. 9B, wherein the spindle is disengaged from the cam follower on the key-cylinder side of the mechanism.
Figure 9B:
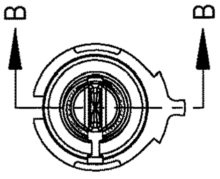
FIG. 9B is an axial view, from the inside, of the sliding lockset mechanism when the outside handle is not engaged with the main spindle.
Figure 9A:
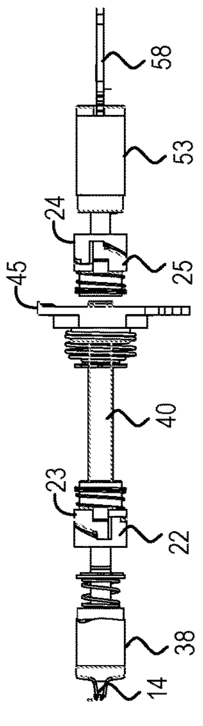
FIG. 9A is a side plan view of the sliding lockset mechanism with both the key cylinder and the thumbturn in horizontal positions.
Figure 10C:
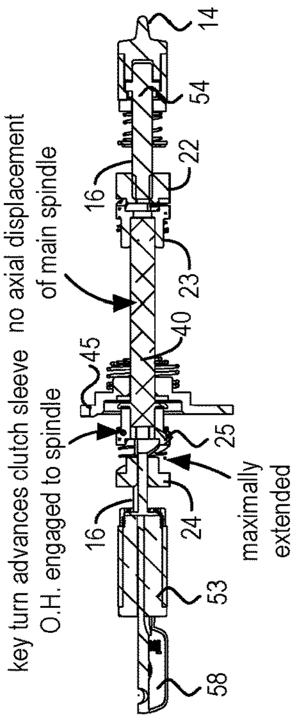
FIG. 10C is a cross sectional view of the sliding lockset mechanism along line B-B of FIG. 10B, wherein the spindle is shifted to the left by the key-cylinder side barrel cam and follower into engagement with the cam follower on the key-cylinder side of the mechanism.
Figure 10B:
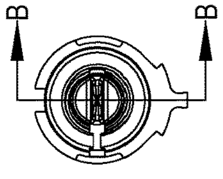
FIG. 10B is an axial view, from the inside, of the sliding lockset mechanism when the outside handle is engaged to the main spindle by a key turn.
Figure 10A:
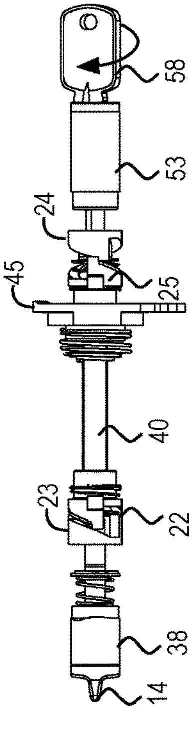
FIG. 10A is a side plan view of the sliding lockset mechanism with the key cylinder in a turned position for gaining entry and the thumbturn in a horizontal position.
Figure 11C:
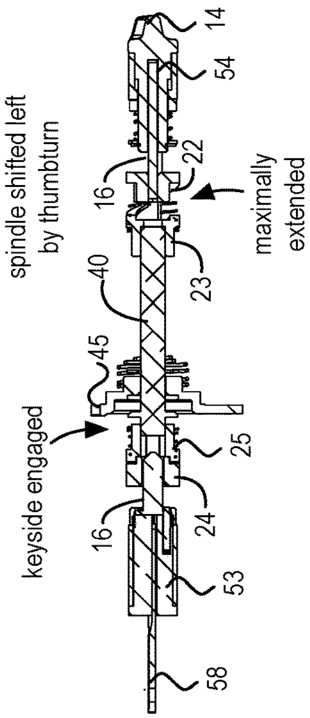
FIG. 11C is a cross sectional view of the sliding lockset mechanism along line B-B of FIG. 11B, wherein the spindle is shifted to the right by the button-cylinder side barrel cam and follower into engagement with the cam follower on the button-cylinder side of the mechanism.
Figure 11B:
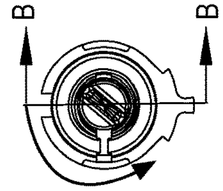
FIG. 11B is an axial view, from the inside, of the sliding lockset mechanism when the handle is engaged to the main spindle by the twist button.

FIGS. 9-11 illustrate the relation of the barrel cam followers 23 and 25 to their respective barrel cams 22 and 24 when the lockset 60 is locked (unclutched) to the outside, unlocked by the key 58, and unlocked by the thumbturn 14, respectively. Before proceeding, it should be observed that the left-to-right progression between the elements shown in FIGS. 9C, 10C and 11C are opposite those shown in FIGS. 1, 2 and 8, 9A, 10A, and 11B. In FIG. 9A, the depressible thumbturn 14 is in a locking position and the key 58 has just been inserted but not yet turned. In FIG. 9C (which is a cross-section of FIG. 9B along C-C), there is no engagement of the barrel cam follower 25 (and outer handle 68) with the key-side end 41 of the spindle 40. Both the outer barrel cam 24 and barrel cam follower 25 are collapsed (maximally juxtaposed) together, meaning that they are minimally expanded (i.e., the outer barrel cam 24 is minimally extended from the barrel cam 24). The same is true for the inner barrel cam 22 and barrel cam follower 23. Therefore, the outer handle 68 is unclutched so that the door is locked. Stated another way, the outer handle 68 is interoperatively disengaged from the latchbolt 63.

In FIG. 10A, the key 58—and with it the barrel cam 24—is turned clockwise (in this implementation), shifting the barrel cam follower 25 into a maximally extended, minimally juxtaposed position with respect to the barrel cam 24. Meanwhile, the inner barrel cam 22 and barrel cam follower 23 remain collapsed together. In FIG. 10C, the key-side end 43 of the spindle 40 is therefore received into the blind hole 105 of the barrel cam follower 25. This clutch action enables the outer handle 68 to operate spindle 40 and in turn retract the latchbolt 63. In this action, it is not necessary to shift the spindle 40 along its axis 32. This mechanism may simply shift the barrel cam follower 25 over the spindle 40.

Figure 11A:
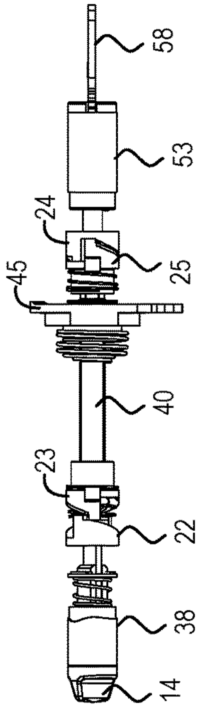
FIG. 11A is a side plan view of the sliding lockset mechanism with the key cylinder in a horizontal position and the thumbturn in an approximately vertical position, realizing a passageway function in which access from the outside is permitted.
Figure 13:
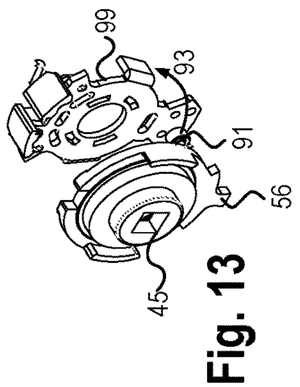
FIG. 13 shows an enlarged view of a handle coupler and spindle driver of FIG. 8.

In FIG. 11A, the key 58 is left in its inactive FIG. 9 position and instead the thumbturn 14 is pressed inward, against spring pressure, and turned clockwise. In FIG. 9, the button-side end 41 of the spindle 40 was already fully received into the blind hole 117 of barrel cam follower 23 (as it should always be). Therefore, in FIG. 11, the turning of the thumbturn 14 pushes not only the barrel cam follower 23, but also the spindle 40 itself, toward the key 58 side of the door. This, in turn, pushes the key-side end 43 of the spindle 40 into the blind hole 105 of the key-side barrel cam follower 25 and into clutching engagement with the key-side barrel cam follower 25. In this action, there need not be any linear axial movement of the key-side barrel cam follower 25. Thus, the key-side barrel cam 25 may remain stationary, for the linear axial movement of the spindle 40 is sufficient to "clutch" the outside door handle 68 to the spindle 40.

Not to be overlooked in the embodiment of FIGS. 9-11, each barrel cam 22 and 24 is connected with its respective barrel cam follower 23 and 25 for coincident rotation. However, in contrast with the key-side barrel cam follower 25, which is selectively engaged to the spindle 40, the thumbturn-side barrel cam follower 23 is always coupled to the spindle 40 in each of FIGS. 9-11. This is true whether the barrel cam follower 23 is maximally extended away from, or maximally juxtaposed to, the barrel cam 22. In some embodiments, the spring 36 plays a role in maintaining this coupling. Therefore, the inside handle 66 is always (in such embodiments) operatively coupled to the main spindle 40 to retract or project the latchbolt 63. The extension of the barrel cam follower 23 from a collapsed position serves not to couple a previously uncoupled inside handle to the main spindle 40, but rather to shift the main spindle 40 toward the key side of the door. Of course, these "always" characteristics pertain to the embodiment of FIGS. 9-11, not necessarily to alternative embodiments.

The foregoing description has focused on FIGS. 1, 2, 5-7 and 9-11 while referring sparingly to some elements of FIG. 8. FIG. 8 is an exploded view of one embodiment of a lock stem and main spindle assembly 10 incorporated into a dual latch and deadbolt assembly, more particularly, into a lockset of the kind described in U.S. patent application Ser. No. 15/393,679, filed Dec. 29, 2016, which is herein incorporated by reference. In locksets with a deadbolt (such as that shown), the dual latch and deadbolt assembly comprises a cam driver 97 that interacts through a lost motion mechanism with a deadbolt link assembly 80. The deadbolt link assembly 80 comprises a cam driver 97 that transfers motion to a first reactor plate 84, which transfers motion to a second reactor plate 86, which transfers motion to a deadbolt trigger gear 88, which transfers motion to a deadbolt tailpiece 89, which transfers motion to a deadbolt assembly 61. As described in connection with the '679 application, the deadbolt link assembly 80 harnesses upward motion of lever 66 to project the deadbolt 64.

FIG. 8 also reveals another significant secondary aspect that enhances the functionality of the lockset 60. The lockset 60 reveals two mechanisms for operating the main spindle 40 from the outside handle 68—(1) the key-and-thumbturn-enabled mechanism that has been the focus up to this point and (2) an independent deadbolt-locking mechanism that operates through a secondary spindle driver 45.

The key-and-thumbturn-enabled mechanism selectively enables the outside lever 68 to be turned downwardly (or its rotational equivalent) to retract the latchbolt 63 and, if the deadbolt is projected, the deadbolt 64. The secondary spindle driver 45, by contrast, enables the outside handle 68 to be turned upwardly (or its rotational equivalent) to lock the deadbolt. This secondary action transmits motion from the outside handle 68 to the handle coupler 99 to which the outside handle 68 is staked, down to a pin 91 (such as a socket head cap screw) riding on a handle coupler paddle. The motion is conveyed from the pin 91 to a tab 56 of the secondary spindle driver 45, thereby driving the spindle 40 to rotate in the same direction as the outside handle 68. In one implementation, this lever-lifting movement does not retract the latchbolt 63, because a latch assembly 62 is selected that only allows one (i.e., the lever-depressing) direction of rotation to retract the latchbolt 63.

When the outside handle 68 is turned downwardly, the pin 91 rotates away from—not against—the tab 56. Therefore, the reverse rotation of the handle coupler 99 does not convey motion to the secondary spindle driver 45. The only way for downward movement of the outside handle 68 to gain access through the locked door, gate or other barrier is for the barrel cam follower 25 to be clutchingly engaged to the main spindle 40. When clutchingly engaged (i.e., engaged in the manner in which a clutch engages), downward movement of the outside handle 68 retracts the latchbolt 63 and the deadbolt 64.

Incidentally, the secondary spindle driver 45 is mounted on the main spindle 40 on the left side of the flange 44 of the main spindle 40 (from the perspective of FIG. 2). The flange 44 acts as a limit to the leftward range of the main spindle 40. When the flange 44 nests inside the left side of the secondary spindle driver 45, the secondary spindle driver 45 blocks the main spindle from traveling any further to the left.

The assembly 60 also comprises an inside housing 74 for housing the interconnecting latch and deadbolt assembly of the above application, including a drive cam 97, a first reactor plate 84, a second reactor plate 86, and a deadbolt trigger 88. Moreover, it comprises the elements of the lock stem and main spindle assembly 10 described above with respect to FIGS. 1-3. The dual latch and deadbolt assembly 60 further comprises a latch linkage assembly 62, a deadbolt link assembly 61, and inside and outside handles 66, 68. Of course, for new installations, the assembly 60 includes inside and outside faceplates 72, 94 and inside and outside door plates 90, 92, a housing plate 98 and cooperating holding plate 76 used to assemble together the inside and outside door plates 90, 92. The housing plate 98 and cooperating holding plate 76 provide throughholes to hold the spindle 40 from moving off of its axis 32.

Various components, including the latch retracting assembly 62, the secondary spindle driver 45, and the barrel cam follower 25, have low-friction surfaces (e.g., metal, nylon or other plastic) to facilitate sliding, axial movement of the main spindle 40. They also serve to secure the main spindle 40 inside the lockset 60 to its axis 32 for mechanically restrained movement, without radial deviations, along the spindle's axis 32.

There are a few structural and functional details to go over. One is that both the barrel cams 22, 24 and the barrel cam followers 23, 25 sit inside the cylindrical interiors of the handle spindles 20. The inside handle spindle 20 is orbitally staked to plate 97, and the outside handle spindle 20 is orbitally staked to spindle driver 99, retaining the barrel-shaped elements 22-25 inside their respective handle spindles 20.

The barrel cam followers 23, 25 have tabs 113 that slidingly mount into slots 21 of the handle spindle 20. The slots 21 prevent rotation but enable linear movement of the barrel cam followers 23, 25 along a longitudinal axis 32 of the spindle 40. While the non-rotatable barrel cam followers 23, 25 can move axially, the rotatable barrel cams 22 and 24 cannot move linearly along the axis 32.

Figure 4:
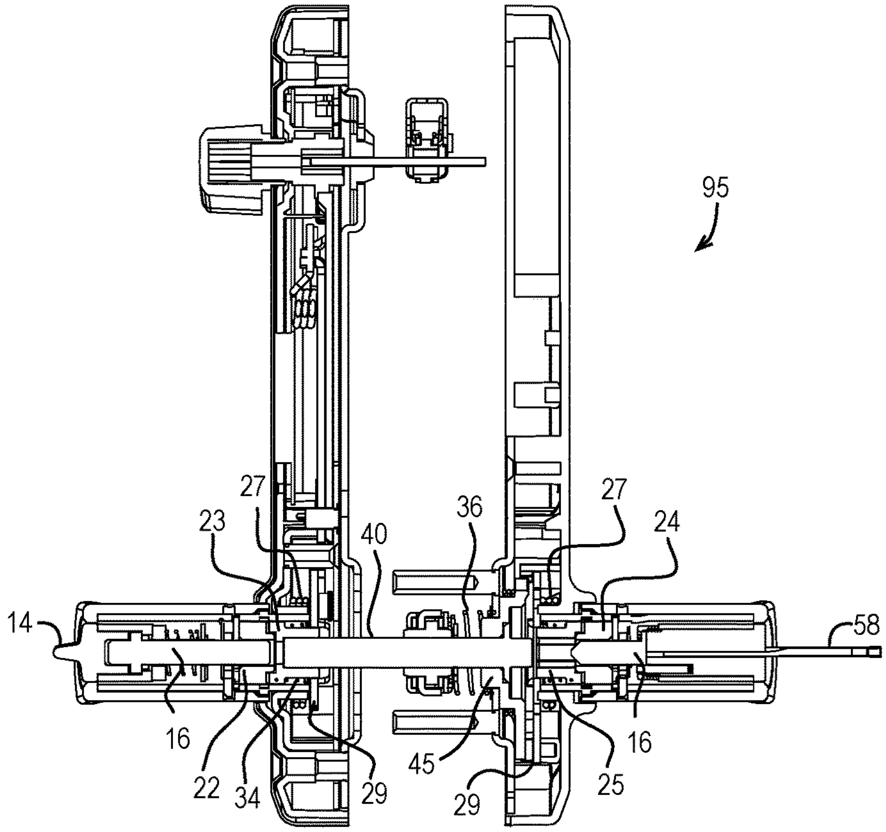
FIG. 4 is a cross sectional view along line A-A of FIG. 3.

FIG. 3 illustrates an assembled dual latch-and-deadbolt lockset 60, including an inside handle 66, a deadbolt thumbturn 70, latchbolt 63, and latchbolt 64. FIG. 4 illustrates a cross section of the dual latch-and-deadbolt lockset 60 of FIG. 3. In FIG. 4, the barrel cam follower 23 is retracted toward the thumbturn 14 as much as possible, causing the barrel cam follower 23 to be maximally juxtaposed against the barrel cam 22. This means that by turning the thumbturn 14, the barrel cam follower 23 can force the spindle 40 in the key-side direction until the spindle 40 butts up against the blind hole bottom 117. Meanwhile, the barrel cam 24 is minimally juxtaposed against the barrel cam follower 25, forcing the spindle 40 as far as possible in the button-side direction.

Spring 36 is assembled over main spindle 40 between a face of stop plate 98 (FIG. 8) and a snap ring 42, which is fixed over main spindle 40. A cylindrical hub 47 of secondary spindle driver 45 protrudes through a hole of plate 98 and is secured in place by push-on external retaining ring ("push nut") 46. Spring 36 biases the main spindle 40 to the left, from the perspective of FIGS. 2 and 8. In this way, spring 36 "resets" the main spindle 40 out of clutching engagement with barrel cam follower 25.

Figure 12:
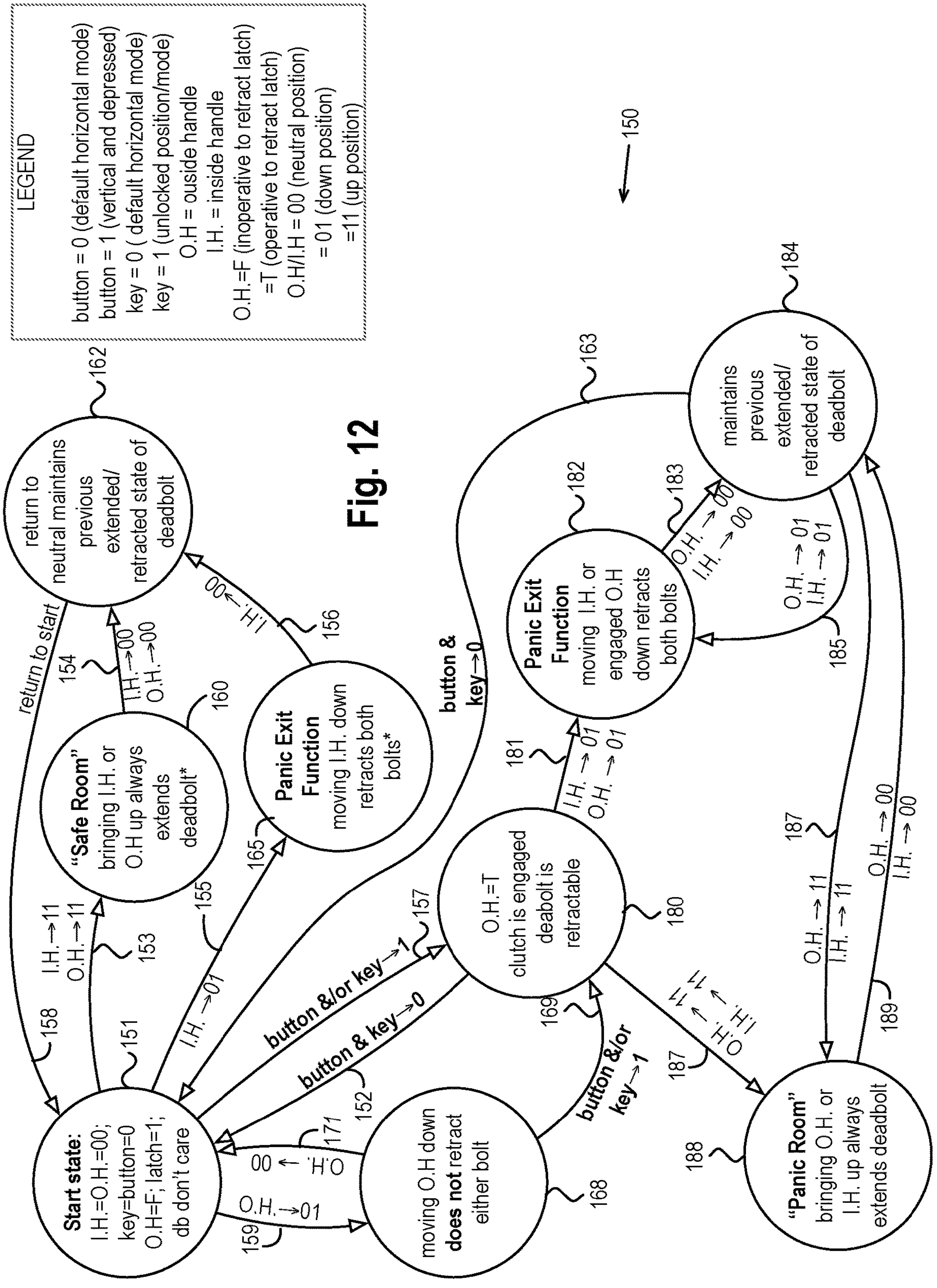
FIG. 12 is a state machine that illustrates the functions of the double lock lockset of FIG. 8.

FIG. 12 illustrates a state machine 150 that at least partially explains functions of one embodiment of the dual latch and deadbolt lockset 60. State machines are typically used to model systems in computer science, logic, and mathematics. They are sometimes useful in modeling machines as well. The lockset 60 described herein can be suitably modeled as a "finite-state machine" in that, for some definition of states, the lockset 60 can be in exactly one of a finite number of states at a given time and changes from one state to another in response to inputs.

The state machine 150 of FIG. 12 is applicable when the lockset 60 is installed on a door or gate or other passageway to enforce restrictions to an access-restricted space or boundary such as a room, building, fenced, partitioned area, or border. Applicant makes no representation that this is the only state machine that can be devised for the lockset 60, or that the state machine 150 is complete. There may be edge cases, corner cases, boundary cases, or special cases that have not been incorporated into the state machine 150.

The default or "start" state 151 of the state machine 150 is arbitrarily characterized by the lockset 60 being locked by at least the latchbolt 63, with neither the button 14 nor the key 58 being activated. The start state could just as easily and arbitrarily be characterized with the button 14 and/or the key 58 being activated.

In state 151, both handles 66 and 68 are in their neutral, spring-biased position (i.e., I.H=00 and O.H.=00). Neither the button 14 nor the key 58 is activated. The latchbolt 63 is projected (i.e., latch=1), which is its default state. For purposes of fitting this state machine 150 onto one page, the start state 151 does not care whether the deadbolt 64 is projected or retracted. Consequently, "O·H=F," meaning the outside handle 168, when in state 151, is inoperative to open the door.

It would be entirely possible to define the "start" case differently as a state in which the outside handle 68 is unlocked. This would be less convenient, though, because there are three different "locked" states, but only one "unlocked state," when the states are defined solely by the key and button positions.

Four actions (at least) may be made from the start state 151. In a first action 153, either the inner handle 166 or the outer handle 168 is lifted or turned in a functionally equivalent direction. This action immediately projects the deadbolt 64 (state 160).

This function allows the occupant to immediately and simultaneously secure both the latchbolt 63 and the deadbolt 64. This function—to the extent that it applies to the inside handle 66—may be referred to herein as a "panic room function" in honor of and in allusion to the 2002 thriller film "Panic Room." This film, starring Jodie Foster, illustrates a break-in and frantic efforts made to secure a safe room from intrusion. The term "room" is used non-literally herein, as the embodiments of this invention are not limited to in-building panic room installations. For purposes of the claims, "panic room" is applicable to any installation in which a lockset such as one descried herein enables deadbolt locking of a lockset from the inside using only the handle.

The inclusion of the handle coupler 99 and secondary spindle driver 45 in the embodiment depicted in FIG. 8 allows deadbolt locking from the outside simply by pulling up the outside handle 68. Advantageously, this enables maintenance personnel managing multiple locks and/or multiple buildings to quickly ensure that all doors are locked, simply by pulling up each outside handle 68.

In action 154, if either handle 66 or 68 is released or gently let down, the handle 66 or 68 returns it to its intermediate, neutral, spring-centered default position (typically horizontal for a lever handle). This puts the lockset 60 into state 162, in which the previous projected or retracted state of the deadbolt 64 is maintained. Coming from state 160, this means that deadbolt 64 remains in a projected position.

In a second action 155 proceeding from the start state 151, the inside/interior handle 66 is pushed down or rotated in a direction equivalent to the handle 66 going down. This action 155 retracts both the latchbolt 63 and the deadbolt 64 (i.e., state 165), immediately allowing egress. The industry refers to this as a "panic function" or "panic lock function" because it allows an occupant to flee with a single lever action.

Typically, state 165 is followed by action 156, in which the door is opened, reclosed, and the inside handle 66 is released, returning the handle 66 to its default position. This puts the lockset 60 into state 162, in which—as stated earlier—the previous projected or retracted state of the deadbolt 64 is maintained. Coming from state 165, this means that the deadbolt 64 remains in its retracted position.

State 162 could be combined with state 151, because the state 151 does not care whether the deadbolt 64 is projected or retracted, the handles 66 and 68 are in the same position, the key 58 and button 14 are in the same position, and the outside handle 68 once again becomes inoperative on return to neutral (O.H.=68) from the panic room and panic function states 160 and 165. Accordingly, path 158 symbolizes the logic returning to the start state 151.

In a third action 157 from the start state 151, the inside button 14 or a key 58 is turned to allow ingress through the passage protected by the lockset 60. This results in the outer handle 68, and in particular the barrel cam follower 25, engaging the spindle 40, either in the manner illustrated by FIG. 10 or the manner illustrated by FIG. 11, and retraction of the deadbolt 64, if it hasn't already been retracted. In the resulting state 180, the outer handle 68 is able to retract the latchbolt 63 (i.e., O.H.=T).

In a fourth action 159 from the start state 151, in which the latchbolt 63 is projected and the outside handle 68 is inoperative to retract the latchbolt 63 (i.e., O.H.=F), the outer handle 68 is pressed down or rotated in an equivalent direction. But as illustrated by state 168, this accomplishes nothing. Because the outside handle 68 is decoupled or disengaged from the spindle 40, neither the latchbolt 63 nor the deadbolt 34 are retracted by this action. Unless the lock button 14 or key 58 is operated, flow returns to the start state 151, as illustrated by path 171.

Whether taking path 169 from state 168 or path 157 from state 151, operation of the lock button 14 and/or key 58 unlocks the lockset 60. In this state 180, the clutch is engaged and the deadbolt is retractable. State machine 150 illustrates three paths proceeding from state 180: lowering either handle (action 181), raising either handle (action 187), or deactivating both the button and the key (action 152). Indeed, state 180 is such a hub that it could serve as a start state in alternative to state 151.

With respect to path 181, lowering the inside handle 66 is always possible, so taking that action retracts both bolts 63 and 64 simultaneously, putting the lockset 60 into state 182. As with state 165, state 182 manifests the panic function with respect to the inside handle 66. In state 180, the clutch formed by barrel cam follower 25 and spindle 40 is engaged, so lowering the outside handle 68 also retracts both bolts 63 and 64 simultaneously, also resulting in state 182. This allows immediate ingress or egress in both directions.

In action 187, raising the inside or outside handle 64 always projects at least the deadbolt 64, if not already projected. It may also be configured to project the latchbolt 63. The resulting state 188 is the same as state 160, except that in state 160, neither the button 14 nor the key 58 are in an active state. In state 188, by contrast, the button 14 and/or key 58 are active.

Path 152 represents deactivating the button 14 and/or key 58. This disengages the clutch, rendering the outside handle 68 inoperative to gain entry. This puts the lockset 60 back into start state 151.

Actions that follow locking or unlocking the lockset 182 may be, and often are, followed by ingress or egress. But that is not necessarily pertinent to the operation of the lockset 60. Therefore, movements of people that do not directly work on the mechanics of the lockset 60 are ignored herein.

The state machine 150 shows one exit path from each of states 182 and 188—letting the handles 66 and 68, with the aid of return springs 27 (FIGS. 4, 8), return to their default position—because it would be unusual to take other paths such as deactivating the key 58 or button 14 before releasing the handles 66 and 68. Releasing the handles 66 and 68 to their default position transitions the state machine 150 from state 182 to state 184.

State 184 maintains the previous projected or retracted state of the deadbolt. State 184 mirrors state 162, except that in state 162, the button 14 and key 58 have not been actuated to engage the outside handle 68 to the spindle 40. In state 184, by contrast, either the button 14 and/or the key 58 have been activated to engage the outside handle 68 to the spindle 40.

State 184 is also presented with three exit actions. In action 185, either of the handles is lowered, landing the lockset 60 into lock state 182. In action 187, either of the handles is raised, projecting the latchbolt 63 and deadbolt 64 to the extent not already projected. In action 163, the button 14 and key 58 are both deactivated, returning the state machine 150 to the start state 151.

The sliding spindle mechanism disclosed herein is advantageously suited to facilities, campuses, and buildings with full-time service or maintenance staff who need to exit locked doors for a brief period of time, for example, to dispose trash, and return quickly. Frequently, doors at large facilities are configured to automatically lock upon exit and require a key or code for re-entry. With a lockset as described herein, maintenance personnel can briefly unlock the door for a "passageway function," perform their task, and return, locking the lock.

It will be observed that while knobs can certainly be used for the lockset 60 described herein, there is an advantage to using levers. With levers, the directions (up or down) are consistently matched with respective functions (locking or unlocking). With knobs, the direction of rotation of the inside knob is matched to the opposite direction of rotation for an outside knob. For example, if rotating an inside knob clockwise retracts the latch, the outside knob would have to be rotated counterclockwise to retract the latch. This inconsistency could delay an occupant from fleeing a burning building (panic function) or from blocking a pursuer from entering the abode (panic-room function). By contrast, consistent use of the levers—up to lock; down to go through—leads to rapid subconscious memorization of what action is needed to lock and what action is needed to go through.

It will be observed that the dual latch-and-deadbolt lockset disclosed herein provides several lock functions. These include an indoor deadbolt locking function wherein movement of a connected inside door handle in a first direction from a neutral main position to a first extent projects a deadbolt, consistent with ANSI/BHMA A156.2 (applying to Cylindrical (Bored) Pre-Assembled Locks and Latches) or ANSI/BHMA A156.13 (applying to Mortise Locks and Latches). These functions also include an indoor panic-exit function (F88 or F09). Movement of the connected inside door handle in a second direction opposite the first direction from the neutral main position to a second extent retracts both the deadbolt and a latchbolt. The lockset has an inside door handle button whose positions select between a passageway function in which the outside door handle is operable to retract the latchbolt and a lock function in which the outside door handle is inoperable to retract the latch. The neutral main position is the position of the inside door handle, which is spring-biased, when no external force is exerted on the outside door handle to retract the latch. In the neutral main position, the latchbolt is projected and wherein movement of the inside door handle from the first or second extent to the neutral main position leave the deadbolt in a position it had immediately before said movement.

The dual latch-and-deadbolt lockset disclosed herein may be further characterized in that it comprises a clutch, wherein the passageway function is implemented by engaging the clutch and the lock function is implemented by disengaging the clutch, so that the outside door handle is still free to rotate along its path of rotation but is unable to turn the spindle to retract the latch. The dual latch-and-deadbolt lockset may also be further characterized in that it comprises an outdoor deadbolt locking function wherein movement of a connected outside door handle in the first direction projects the deadbolt and an outdoor pass-through function wherein when a key is used to unlock a key cylinder in the outside door handle, movement of the connected outside door handle in the second position retracts both the deadbolt and a latchbolt.

Accordingly, the foregoing disclosure may be characterized as a method of controlling access between two spaces separated by a door, the method comprising equipping the door with a lock comprising the following functions: (1) an indoor deadbolt locking function wherein movement of a connected inside door handle in a first direction from a neutral main position to a first extent projects a deadbolt; (2) an indoor panic-exit function wherein movement of the connected inside door handle in a second direction opposite the first direction from the neutral main position to a second extent retracts both the deadbolt and a latchbolt; and (3) an inside door handle button whose positions select between a passageway function in which the outside door handle is operable to retract the latchbolt and a lock function in which the outside door handle is inoperable to retract the latch; wherein the neutral main position is the position of the inside door handle, which is spring-biased, when no external force is exerted on the outside door handle to retract the latch; wherein in the neutral main position, the latchbolt is projected and wherein movement of the inside door handle from the first or second extent to the neutral main position leave the deadbolt in a position it had immediately before said movement.

CONCLUSION

The sliding spindle assembly can be incorporated into a legacy lockset, replacing existing mechanisms for operating the main spindle. For example, the sliding spindle assembly, which locks the lockset by decoupling the outside door handle from the main spindle, could replace a pre-existing assembly that locks the lockset by preventing rotation of the main spindle. By upgrading the lockset in this manner, existing hardware, such as the deadbolt, latchbolt, trim, and handles can continue to be used in the upgraded lockset.

Lockset kits are envisioned comprised of various combinations of the novelties discussed in this specification, including, but not limited to the sliding spindle mechanism as well as other lockset elements.

Various electronic actuators, switches, controllers, and other devices may be employed with the sliding spindle lockset and its components. The resultant locksets may be fully or largely mechanical, electronic, or a combination thereof. Parts may be made of various materials as warranted, including metal, carbon, polymers, and composites.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein but is limited only by the following claims.

We claim:

1. A lockset apparatus for assembly into a lockset designed for a barrier having opposing first and second sides, the lockset apparatus comprising:

a spindle;

opposing first and second handles configured to mount to the opposing first and second sides, respectively;

first and second opposing locking members for the first and second handles, respectively, each locking member comprising a lock button or key cylinder; and a spindle coupler;

wherein in the assembled lockset:

the spindle is mounted for translation along an axis of the spindle in a first direction toward the first side and in an opposite second direction toward the second side;

the spindle is operatively and rotationally linked to the latchbolt;

the first locking member is operatively connected to the spindle coupler to selectively slide the spindle coupler into engagement with a first end of the spindle;

the second locking member is operatively connected to a second end of the spindle to selectively translate the spindle, with respect to the lockset, into engagement with the spindle coupler;

the lockset has locked and unlocked states characterized by at least three spatial relationships between the spindle, the spindle coupler, and the assembled lockset, including:

first and second spatial relationships in which the spindle coupler is engaged with the spindle, thereby enabling the first handle to retract and project the latchbolt, wherein in the first spatial relationship the spindle is positioned closer to the first side than the second side, and in the second spatial relationship the spindle is positioned closer to the second side than the first side; and a third spatial relationship in which the spindle is positioned closer to the second side than the first side, and the spindle coupler is positioned closer to the first side than the second side and is disengaged with the spindle, thereby disabling the first handle from retracting and projecting the latchbolt.

2. The lockset assembly of claim 1, further comprising:

a first cam and follower assembly that, in the assembled lockset, converts rotational movement of the first locking actuator into movement of the spindle coupler along the spindle axis, wherein the first cam and follower assembly comprises a first cam and a first follower;

a second cam and follower assembly that, in the assembled lockset, converts rotational movement of the second locking actuator into linear movement of the spindle along the spindle axis, wherein the second cam and follower assembly comprises a second cam and a second follower.

3. The lockset assembly of claim 2, wherein the spindle coupler is a first receiver that is combined or integrated with the first follower, and the first receiver is shaped to fit over a first end of the spindle.

4. The lockset assembly of claim 2, wherein the spindle coupler is a male insert that is combined or integrated with the first follower.

5. The lockset apparatus of claim 1, further comprising:

a first spring that biases the spindle coupler toward the first side to disengage the spindle; and a second spring that biases the spindle toward the second side;

wherein the first and second springs bias the lockset assembly in favor of a locked state in which the first handle is disabled from retracting or projecting the latchbolt.

6. The lockset apparatus of claim 5, wherein transition of the lockset from an unlocked state to a locked state comprises:

operation of the first locking member in a first unlocking motion to translate the spindle coupler and the spindle, if the spindle coupler is already coupled to the spindle, toward the second side; and operation of the first locking member in a second unlocking motion, after the first motion, that results in translation of the spindle coupler toward the first side and out of engagement with the spindle.

7. The lockset apparatus of claim 5, wherein transition of the lockset from an unlocked state to a locked state comprises a locking motion of the second locking member that, in conjunction with the second spring, shifts the spindle toward the second side.

8. The lockset of claim 5, wherein:

two independent operations are provided to transition the lockset from a locked state, in which the spindle coupler and spindle are disengaged, to an unlocked state, in which the spindle coupler and spindle are engaged;

a first of said operations comprises an unlocking motion of the first locking member to translate the spindle coupler into clutching engagement with the spindle without axially translating the spindle; and a second of said operations comprises an unlocking motion of the second locking member to translate the spindle into clutching engagement with the spindle coupler without axially translating the spindle coupler.

9. A lockset for a barrier, the lockset comprising:

first and second handles;

a latchbolt;

a main spindle coupled to the latchbolt and mounted for translation along an axis perpendicular to opposing first and second faces of the barrier with a range of travel confined between a first limit relatively closer to the first face than the second face and a second limit relatively closer to the second face than the first face;

the main spindle also being mounted for rotational movement that, when rotated sufficiently in at least one direction, retracts the latchbolt;

a spindle coupler, also mounted for translation along the perpendicular axis, configured for engaging or disengaging the main spindle;

a first lock cylinder or button, incorporated in the first handle, linked to the spindle coupler that is operative to shift the spindle coupler into and out of clutching engagement with the main spindles; and a second lock cylinder or button, incorporated in the second handle, linked to the main spindle that is operative to shift the main spindle along its axis from the second limit to the first limit to engage the spindle coupler;

wherein:

spatial interrelationships between the main spindle, the spindle coupler, and the lockset determine whether the lockset is locked or unlocked:

in a first state, the main spindle is positioned adjacent the first limit and engaged with the spindle coupler;

in a second state, the spindle is positioned adjacent the second limit and also engaged with the spindler coupler;

in a third state, the spindle is positioned adjacent the second limit and disengaged with the spindler coupler; and engagement of the spindle coupler with the main spindle unlocks the lockset and enables the first handle to retract the latchbolt, and disengagement of the spindle coupler from the main spindle locks the lockset and disables the first handle from retracting the latchbolt.

10. The lockset of claim 9, further comprising:

a first cam that links the first lock cylinder or button to the spindle coupler;

wherein:

the spindle coupler comprises a first cam follower interoperative with the first cam; and the first cam follower has a cam-facing surface that, when pushed upon by rotation of the first cam, shifts the spindle coupler into clutching engagement with the main spindle.

11. The lockset of claim 10, further comprising:

a second cam that links the second lock cylinder or button to the main spindle;

a second cam follower that is incorporated in an end of the main spindle or that receives and retains an end of the main spindle;

wherein the second cam is mounted to the second handle cylinder for rotational movement; and wherein the second cam, when rotated, shifts the main spindle along its axis.

12. The lockset of claim 10, wherein the first cam follower is slidingly mounted inside the first handle spindle so as to turn with the outside handle spindle and advance or retreat axially within and with respect to the first handle spindle.

13. The lockset of claim 10, wherein the first cam follower rides in slots of the first handle spindle.

14. The lockset of claim 10, wherein the first cam comprises a body and a partially circumferential ramp.

15. The lockset of claim 10, wherein:

the first cam is operable to rotate in a first direction to linearly shift the spindle coupler into engagement with the main spindle, when they are not already engaged, and to shift both the spindle coupler and the main spindle together, when they are already engaged;

the first cam is operable to rotate in a second direction, opposite the first direction, to return the spindle coupler into the outside-handle-uncoupling position.

16. The lockset of claim 10, further comprising a second cam follower interoperative with the second cam, wherein:

the second cam follower is, for as long as the lockset is assembled, permanently linked with the main spindle; and the second cam follower has a cam-facing surface that, when pushed upon by rotation of the second cam, shifts the cam follower forward, driving the main spindle into clutching engagement with the spindle coupler.

17. The lockset of claim 10, further comprising:

a spring to urge the main spindle into a position that disengages the first cam follower from the main spindle when the button lock is in an outside-handle-decoupling position.

18. The lockset assembly of claim 9, further comprising:

a first handle spindle supporting a range of motion for the first handle, the handle spindle selectively linked via the spindle coupler to the main spindle, wherein when the spindle coupler is engaged to the main spindle, the handle spindle is operative to turn the main spindle to retract the latchbolt, but when the spindle coupler is disengaged from the main spindle, the handle spindle is free to rotate through its range of motion but is inoperative to turn the main spindle to retract the latchbolt.

19. The lockset of claim 18, further comprising:

a deadbolt;

an outside handle coupled to the first handle spindle;

a handle coupler coupled to the outside handle and a spindle driver coupled to the main spindle, wherein:

the handle coupler is operative to transfer rotational motion in a first rotational direction to the spindle driver, and to thereby project the deadbolt into a locking position;

the handle coupler is inoperative to transfer rotational movement in a second rotational direction opposite the first rotational direction, and thus is inoperative to retract the deadbolt back to an unlocking position;

the first handle spindle is only operative in the second rotational direction to retract the latch;

whereby rotation of the outside handle in the second direction is operative, when the deadbolt is retracted and the spindle coupler is clutchingly engaged with the main spindle, to retract the latchbolt, and rotation of the outside handle in the first direction is operative, when the deadbolt is retracted, to project the latchbolt.

20. The lockset of claim 18, wherein when the deadbolt is projected, retraction of the deadbolt from outside requires a key, which is operatively asymmetric from not requiring a key to project the deadbolt from outside.

21. A double-latch lockset comprising:

a latchbolt;

a latchbolt retractor coupled to the latchbolt;

a deadbolt;

an inside handle;

an outside handle;

a lock cylinder or button in the inside handle;

a lock cylinder in the outside handle;

a main spindle directly coupled to the latchbolt retractor operable through turning about its axis to retract the latchbolt;

a clutch that selectively engages and disengages the main spindle to and from the outside handle, the clutch comprising a spindle coupler and a portion of the main spindle;

an inside cam operated by the inside handle lock cylinder or button to shift the main spindle in a first direction toward the outside handle;

an outside cam operated by the outside handle to shift the spindle coupler in a second direction, opposite the first direction, toward the inside handle;

wherein when the clutch is disengaged, a sufficient shift of either the main spindle in the first direction or of the spindle coupler in the second direction engages the clutch; and wherein when the clutch is engaged, a sufficient shift of the main spindle in the second direction, after the main spindle is maximally shifted to the first direction, followed by a shift of the spindle coupler in the first direction, disengages the clutch;

wherein the lockset supports both a restricted access function and a passageway function.

22. The double-latch lockset of claim 21, further comprising a link assembly between the main spindle and the deadbolt; wherein the link assembly:

projects the latchbolt when the inside handle is rotated or moved in one direction from a neutral main position to a first limit; and retracts the latchbolt when the inside handle is rotated or moved in an opposite direction from the neutral main position to a second limit.

23. The double-latch lockset of claim 21, further comprising:

a key receptacle in the outside handle lock cylinder, wherein operation of the key receptacle is operable to engage and disengage the clutch in order to convert the lockset between a restricted access function and a passageway function.

24. The double-latch lockset of claim 21, further comprising:

a secondary spindle driver assembly coupling the outside handle to the main spindle, wherein the secondary spindle driver assembly is secondary to the clutch;

the secondary spindle driver assembly comprising a handle coupler coupled to the outside handle and a spindle driver coupled to the main spindle, wherein:

the handle coupler is operative to transfer rotational motion in a first rotational direction to the spindle driver to project the deadbolt into a locking position;

the handle coupler is inoperative to transfer rotational movement in a second rotational direction opposite the first rotational direction, and thus is inoperative to retract the deadbolt back to an unlocking position;

whereby rotation of the outside handle in the second direction is operative, when the deadbolt is retracted and the spindle coupler is clutchingly engaged with the main spindle, to retract the latchbolt, and rotation of the outside handle in the first direction is operative, when the deadbolt is retracted, to project the deadbolt.

* * * * *